United States Patent [19]

Schoenick

[11] 4,198,814
[45] Apr. 22, 1980

[54] CHAIN HAVING DISASSEMBLY DETENT
[75] Inventor: Ralph R. Schoenick, Mequon, Wis.
[73] Assignee: Rexnord Inc., Milwaukee, Wis.
[21] Appl. No.: 938,616
[22] Filed: Aug. 31, 1978
[51] Int. Cl.² .............................................. F16G 13/06
[52] U.S. Cl. .......................................... 59/84; 59/90;
74/250 C; 74/251 C; 74/255 R
[58] Field of Search ................... 59/85, 86, 87, 88, 89,
59/90, 93, 78, 84; 74/254, 250 C, 245 C, 246,
249, 251 C; 198/852, 845, 851

[56] References Cited

U.S. PATENT DOCUMENTS

| | | | |
|---|---|---|---|
| 856,350 | 6/1907 | Kingston | 74/251 C |
| 2,298,604 | 10/1942 | Webb | 74/254 |
| 2,600,174 | 6/1952 | Sheehan | 74/246 |
| 2,638,009 | 5/1953 | Beveridge | 74/254 |
| 2,915,909 | 12/1959 | Boron | 59/84 |
| 3,742,863 | 7/1973 | Rosenberger | 74/254 |
| 4,020,629 | 5/1977 | Wilmot | 59/85 |
| 4,143,512 | 3/1979 | Templin | 59/85 |
| 4,150,584 | 4/1979 | Theijsmeijer | 74/255 R |

FOREIGN PATENT DOCUMENTS

| | | | |
|---|---|---|---|
| 238298 | 4/1962 | Australia | 59/85 |
| 565271 | 3/1958 | France | 59/85 |

*Primary Examiner*—Francis S. Husar
*Assistant Examiner*—Gene P. Crosby

[57] ABSTRACT

A chain of the trolley conveyor type has T-headed pins and links with slots at each chain joint for assembly and disassembly wherever desired. The slots of the center link are slightly restricted to prevent disassembly when not desired, as in handling the chain. Also, U-shaped center link bushings in which the pins are turnable and with which the pins may pivot for chain side-flexing provide a restriction to assembly and disassembly and particularly the latter so that unintended disassembly is prevented.

2 Claims, 6 Drawing Figures

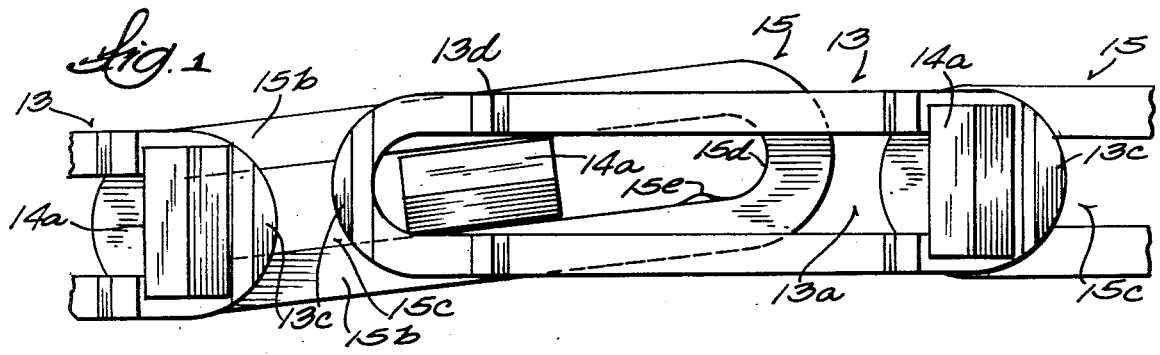
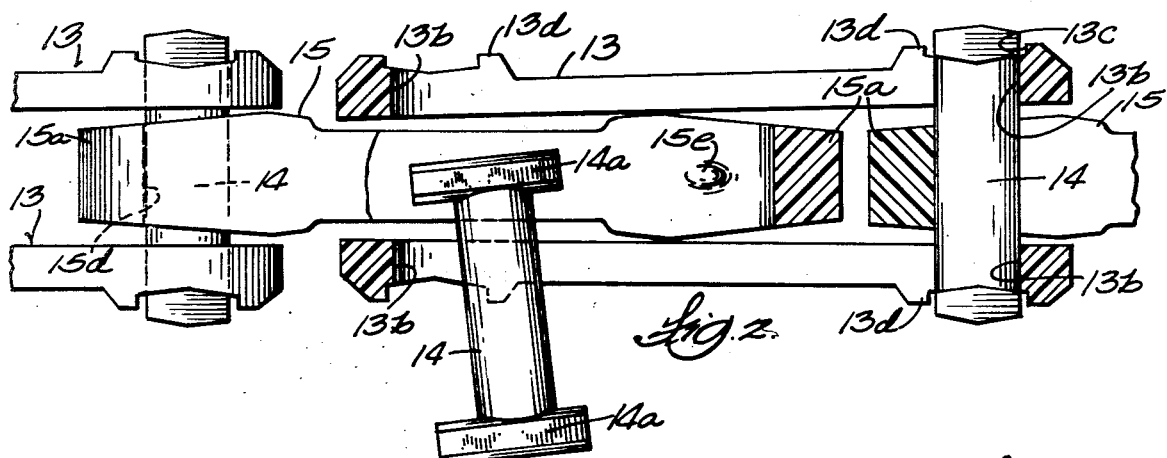
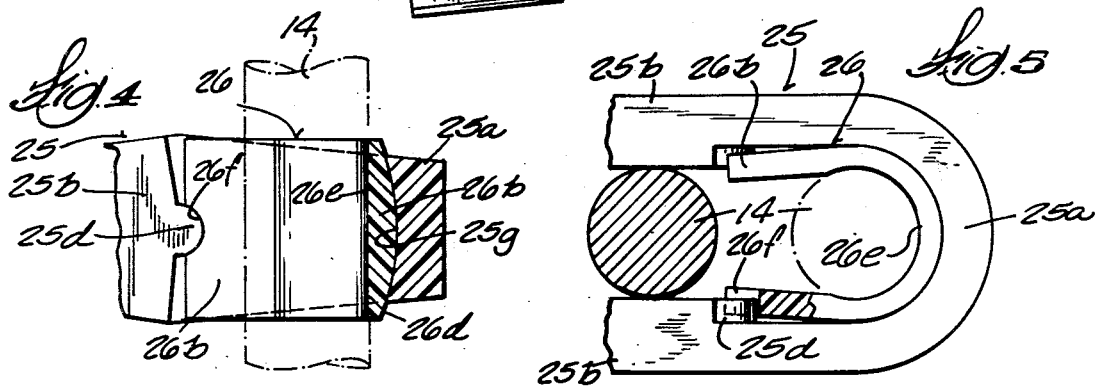
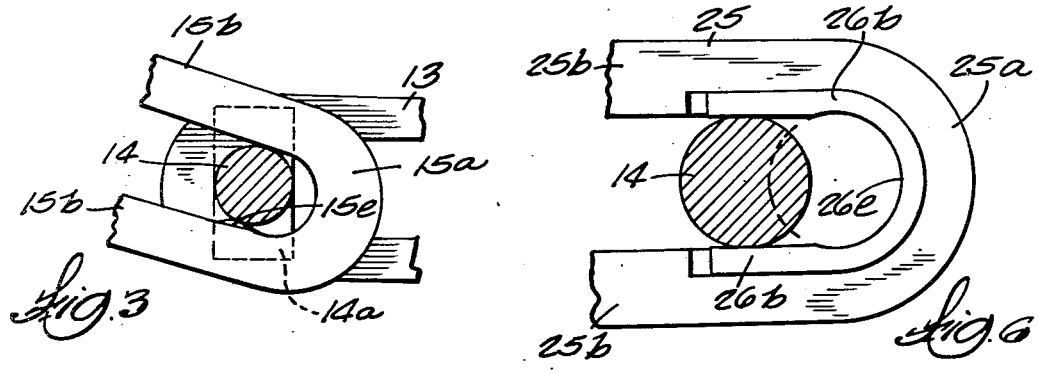

4,198,814

CHAIN HAVING DISASSEMBLY DETENT

BACKGROUND OF THE INVENTION

The copending application of Frederik Theijsmeijer, Ser. No. 816,243, filed July 18,1977 now U.S. Pat. No. 4,150,584 discloses an improved block and bar chain of the trolley conveyor type which includes a center link having an improved U-shaped bushing at each end of the link. The bushing with the center link is respectively turnable on the pin; the center link is pivotable on either bushing about a separate axis normal to that of the pins. The improved double flexure of the chain reduces the stress in the chain parts comprising the joint and in turn allows the center link and the bushings in particular to be of a molded plastic construction of the required configuration. The inserts have pivot and retaining means and their plastic construction permits their "snap-in" assembly.

A desirable characteristic of this improved, lightweight chain is the ease of its assembly and disassembly. However, in handling a long assembled length of such lightweight chain, two adjacent links at any joint may readily become so arranged that the pin falls out. This then requires the reassembly of the chain at that joint.

The object of the present invention was first to provide a simple, reliable means of overcoming this problem in such chain. A further object is to provide a chain pin bushing generally with detent means for that purpose. A more general object is to provide such detent means for that purpose also in similar chain which does not include such a bushing.

BRIEF SUMMARY OF THE INVENTION

A chain having links with slots of each joint and in which the pin is moved laterally for chain assembly and disassembly includes links provided with a moderately restricted slot at each end of the center link to prevent unintended disassembly of the chain. In the preferred embodiment of the invention the center link includes an elastic U-shaped bushing at each joint. The slot between the two arms of the bushing is constricted and the two arms are yieldable within the link to allow lateral pin movement in the slot but with a preselected force sufficient to prevent the unintended disassembly of the chain at any such joint as in handling the chain. The pin is turnable in the bushing for chain articulation and the bushing may further pivot within the link as for sideflexing of the chain.

BRIEF DESCRIPTION OF THE DRAWINGS

FIG. 1 shows several links of a chain in plan. A center link has been shifted to a position between two pin links. Their connecting pin is shown partially removed. The length and height of the links and the length and width of the pin assembly slots are shown in this figure.

FIG. 2 is a partially sectioned view of one side of the several links of the chain shown in FIG. 1. The width of the links and length of the pins are shown in this Figure.

FIG. 3 is a plan view of one chain joint. One pin link is removed and the pin is sectioned. The chain joint is partially disassembled.

FIG. 4 is an enlarged central longitudinal section through one end of the center link which is here provided with U-shaped bushing.

FIGS. 5 and 6 are similarly enlarged and show in plan the end of the center link shown in FIG. 4. The pin is shown in section. In FIG. 5 the normal position of the pin is shown by the broken lines. In FIG. 6 the two ends of the bushing are expanded by the pin as it is moved to the left or right in the figure for removal or insertion.

DETAILED DESCRIPTION

The chain which is shown partially assembled or disassembled in FIGS. 1 and 2 includes the pin links 13, the pins 14 and the center links 15.

Each pin 14 is cylindrical and has a T-head 14a at each end. Each T-head 14a is formed by opposite projections and the projections at the two ends of the pin are similarly oriented and should be of a width not greater than the diameter of the pin.

Each pin link 13 has a center slot 13a between the semi-cylindrical bearing areas 13b at the opposite ends of the link. Two pin links 13 with two pins 14 bearing against the respective bearing areas 13b form a pin link assembly. In such assembly the T-heads 14a overlie the opposite sides of the links 13 and are retained between the several projections 13c and 13d of the links. Projections 13c are at the ends of the respective links 13 and projections 13d are nearer the centers of links 13. In some chains each link 13 may include a center web, not shown, such that the link has two slots.

Each center link 15 is in the form of an elongated loop having U-shaped ends 15a integrally joined by spaced parallel bars 15b. The two ends 15a and the two bars 15b define a central lengthwise slot 15c extending between the two semi-cylindrical bearing areas 15d. As shown in FIG. 2, portions of the ends 15a are distinctly wider than bars 15b and space the links 13 so that the T-heads 14a of the pins 14 are retained as described.

In the assembled chain each end 15a of a center link 15 extends between and spaces the corresponding ends of the two adjacent pin links 13. When the chain is in tension the pin 14 at each chain joint bears against the bearing area 15d of link 15 and against the bearing areas 13b of the pin links 13. For chain articulation as in operation over a sprocket not shown, each center link 15 turns on a pin 14, i.e. about the axis of the pin. Some side-flexing of the chain in the plane of the pin axis is also allowed by the spacing of links 13. In the chain shown in FIGS. 1 and 2 the U-shaped ends 15a pivot on the respective pins.

In the assembly of the chain at each chain joint, the two corresponding ends of two pin links 13 are spaced by the narrower bars 15b of a center link 15 as shown in FIG. 2 and a pin 14 is inserted in slots 13a of links 13 and in slot 15c of the link 15 and is then turned 90°. The narrower spacing of links 13 allows the T-heads 14a to clear projections 13d of links 13 so that pin 14 may be moved laterally in the slots and against the bearing areas 13b of links 13. Center link 15 is then pulled lengthwise so that pin 14 is moved laterally between bars 15b and against the bearing area 15d. The disassembly of the chain is the reverse. That is, a center link 15 is moved lengthwise so that its narrower bars 15b allow the ends of links 13 to be moved together sufficiently to allow the T-heads 14a of pin 14 to clear projections 13d. Pin 14 can then be turned 90° and moved laterally in slots 13a of links 13 and slot 15c of link 15 which are in registry and the pin is then withdrawn endwise from the slots.

The ease of such assembly and disassembly is a distinguishing feature of such chain. However, the chain is usually handled in lengths of some number of feet and in handling, the chain may come apart in shorter lengths.

According to the present invention, each center link 15 at each end includes at least one small projection such as the projection 15e which is integrally formed with the link 15. As shown, the projection 15e is spaced from the bearing area 15d so as not to interfere with the side-flexing of the chain as described. However, the projection 15e does interfere moderately with moving the pin laterally in disassembling the chain as described. That is, the width of slot 15c at the projection is just slightly less than the diameter of pin 14 so that some force is required to move the pin over the projection.

If the link 15 is of iron or steel construction the high modulus of elasticity of the link allows only a very slight interference which may be impracticable to provide in many or most instances. However, for example, if the link is molded of an engineering thermoplastic such as an acetal resin, two factors are changed. One is that the chain is then of much less weight per given length and convenient handling of the chain in much longer lengths is possible. The longer lengths are more susceptible of coming apart and practicably preventing such occurrences is especially desireable. The other factor, of course, is the lower modulus of the chain which is such that projections 15e may be practicably included in the link as molded.

Another possibility makes a single projection 15e at each joint practicable and is shown in FIG. 3. If required, link 15 may be turned as a lever between links 13 so that the projections 13c and 13d of links 13 engage the T-heads 14a of the pin and rotate the latter within slot 15c and in effect cause the pin to roll over projection 15e. Notwithstanding theory, the pin slides more readily over its greater area of contact with the surface of link 15 opposite projection 15e.

In the further preferred embodiment of the invention the center link of the chain is provided at each end with a bushing for improved sideflexing of the chain. The end 25a of link 25 shown in FIGS. 4-6 is provided with the improved bushing 26 described supra in Background of the Invention. The bars 25b partially shown correspond with bars 15b.

As shown in FIG. 5, bars 25b are stepped to receive the bushing 26 and as shown in plan in FIG. 4 each bar 25b includes the circular boss 25d which is located centrally respecting the two sides of the link 25. The centers of the two bosses 25d at the end of link 25 define a pivot axis.

With reference to FIGS. 4-6, the bushing 26 includes a semi-circular portion 26a which joins the proximal ends of the spaced parallel arms 26b. The portion 26a has inner and outer bearing surfaces 26c and 26d, respectively. The outer bearing surface 26d fits the corresponding inner surface 25e of the end 25a of link 25. The two surfaces 26d and 25e are circular with respect to the axis referred to. The end of each arm 26b is provided with a centrally located circular notch 26e, which fits a boss 25d.

In the assembled chain the outer bearing surface 26d of the bushing bears against the inner bearing surface 25e of link 25. When the chain is in tension the pin 14 at each chain joint bears against the bearing areas 13c of the pin links 13 as previously described and against the bearing surface 26c of bushing 26. For chain articulation as in operation over a sprocket not shown, center link 25 with its respective bushing 26 turns on pin 14, i.e. about the axis of the pin.

Link 25 is also pivotable with respect to either of its bushing 26 within limits, for side-flexing of the chain at each chain joint. That is, each bushing 26 is allowed limited pivotal movement on bosses 25d and about the axis referred to.

According to the present invention, arms 26b are spaced normally less than the diameter of pin 14 so that movement of pin 16 in the slot between the arms 26b is restrained particularly in the disassembly of the chain. In particular, the arms 26b of bushing 26 normally converge slightly. Optionally, their thickness may be such that the pin 14 also has a slight interference fit therebetween. That is, as pin 14 is moved between arms 26b, the arms are spread apart and are pressed against the inner sides of the U-shaped end 25a of link 25. It should be noted that in the assembly of the chain, movement of pin 14 initially engages the distal ends of arms 26b and should require only a nominal effort to move the pin further and position the pin against bearing surface 26e. However, when pin 26 is so positioned, movement of pin 14 oppositely therefrom engages the proximal ends of arms 26b and their resistance to such movement of pin 14 is more significant and sufficient to prevent such movement unless effected with an overcoming force. A force in the order of two pounds weight ($2 \times 4.4482 \times 10^5$ dynes) or more would be typical of the force having the objective of the present invention which is to prevent the unintentional disassembly of the chain at any of its joints as in handling the chain. It should be noted that the normal convergence of arms 26b is not such that their ends lose engagement with the bosses 25d of link 25.

I claim:

1. In a chain having pairs of spaced pin links, center links and a T-headed pin at each chain joint and connecting the corresponding ends of each pair of pin links and the intermediate end of the adjacent center link, said ends having pin assembly slots in partial registry so as to define the bore for the pin, the center link being turnable on the pin for chain articulation and laterally pivotable on the pin for chain side-flexing, the outside of each pin link being indented to receive and retain the T-head, each center link being narrowed between its ends to allow a chain assembly and disassembly procedure which includes and requires laterally shifting of the pin in the center link assembly slot, said chain being of the improved type wherein the center link includes a U-shaped bushing which defines the pin bore and the assembly slot in part and which is turnable with the pin in side-flexing of the chain; the further improvement wherein the bushing is of an elastic material and the assembly slot between the ends thereof is narrower than the diameter of the pin such that shifting of the pin requires spreading the ends of the bushing with a deliberate effort and the inadvertent or unintentional release of the pin is prevented.

2. The improved chain comprising pairs of pin links and intermediate center links, each center link having one end between and spacing the corresponding ends of two pin links, said ends having aligned bores and an interconnecting round pin extending therethrough, the center link being turnable on the pin for chain articulation and laterally pivotable on the pin for chain side-flexing, said chain being of the known type wherein each end of the pin has a T-head, each bore is extended toward the center of the link to provide an assembly slot, the outside of each pin link is indented to receive and retain the T-head, and the center link is narrowed between its ends to allow a chain assembly and disassembly procedure which includes and requires shifting of the pin in the assembly slot, each end of each center link including a U-shaped bushing which defines the pin bore and the assembly slot in part and which moves with the pin and relative to the link in side-flexing of the chain; the improvement wherein the bushing is of an elastic material and the assembly slot between the ends thereof is narrower than the diameter of the pin such that shifting of the pin for removal of the pin requires spreading the ends of the bushing with a deliberate effort and such that the inadvertent or unintentional release of the pin is prevented.

* * * * *